United States Patent
Gomis de Dios

(10) Patent No.: US 8,600,447 B2
(45) Date of Patent: Dec. 3, 2013

(54) MENU ICONS WITH DESCRIPTIVE AUDIO

(75) Inventor: Ferran Gomis de Dios, Tufangying Jiangu Jiayuan (CN)

(73) Assignee: Flextronics AP, LLC, Broomfield, CO (US)

( * ) Notice: Subject to any disclaimer, the term of this patent is extended or adjusted under 35 U.S.C. 154(b) by 296 days.

(21) Appl. No.: 12/750,486

(22) Filed: Mar. 30, 2010

(65) Prior Publication Data

US 2011/0244922 A1 Oct. 6, 2011

(51) Int. Cl.
*H04M 1/00* (2006.01)
*H04B 1/38* (2006.01)

(52) U.S. Cl.
USPC .......................................... 455/566; 345/169

(58) Field of Classification Search
USPC .................... 455/550.1, 566, 569.1; 345/169; 704/260
See application file for complete search history.

(56) References Cited

U.S. PATENT DOCUMENTS

| | | | |
|---|---|---|---|
| 5,856,827 A | 1/1999 | Sudo | |
| 6,463,304 B2 | 10/2002 | Smethers | |
| 6,608,637 B1 | 8/2003 | Beaton et al. | |
| 6,768,450 B1 | 7/2004 | Walters et al. | |
| 6,889,064 B2 | 5/2005 | Baratono et al. | |
| 6,944,482 B2 | 9/2005 | Engstrom et al. | |
| 7,188,320 B1 | 3/2007 | Lander | |
| 7,336,282 B2 | 2/2008 | Kato et al. | |
| 2001/0003097 A1 | 6/2001 | Jeoung | |
| 2001/0012790 A1 | 8/2001 | Park et al. | |
| 2001/0046886 A1 | 11/2001 | Ishjgaki | |
| 2002/0072395 A1 | 6/2002 | Miramontes | |
| 2003/0064757 A1* | 4/2003 | Yamadera et al. | 455/566 |
| 2006/0224386 A1* | 10/2006 | Ikegami | 704/260 |
| 2006/0267931 A1* | 11/2006 | Vainio et al. | 345/156 |
| 2007/0117080 A1* | 5/2007 | Hsi | 434/319 |
| 2007/0213092 A1 | 9/2007 | Geelen | |
| 2008/0262731 A1 | 10/2008 | Pai | |
| 2009/0248419 A1* | 10/2009 | Spaulding et al. | 704/275 |

OTHER PUBLICATIONS

Office Action (translation) issued for Taiwanese application No. 093102688 mailed Dec. 15, 2010, 10 pages.

* cited by examiner

*Primary Examiner* — Ping Hsieh
(74) *Attorney, Agent, or Firm* — Haverstock & Owens LLP

(57) ABSTRACT

A mobile phone comprising: a user interface configured to display a menu system and to receive input; and an electronic device configured to: provide the menu system having menu levels with each menu level comprising distinct menu items, enable the user to make a preliminary selection of any distinct menu item at a first menu level, wherein the user remains at the first menu level upon making the preliminary selection, provide an audio output in response to the user making a preliminary selection of any of the distinct menu items, wherein the audio output is unique for each distinct menu item, and enable the user to make a determinative selection of any distinct menu item at a first menu level only after a preliminary selection of that distinct menu item has been made, wherein the user proceeds to a second menu level upon making the determinative selection.

32 Claims, 3 Drawing Sheets

MENU ICONS WITH DESCRIPTIVE AUDIO

FIELD OF THE INVENTION

The present invention relates to the field of menu items on a mobile phone. More particularly, the present invention relates to menu items on a mobile phone having associated audio.

BACKGROUND OF THE INVENTION

Many mobile phones typically provide menus for a user to select the operation the phone is to perform. The menu provides several items from which the user can make the selection. However, the presentation of these menu items is currently limited to a visual display.

SUMMARY OF THE INVENTION

The present invention improves the menu system for mobile phones by providing distinct sounds for different menu items, thereby allowing a user to scan through and identify the menu items without having to rely solely on their visual presentation. This feature is particularly helpful for blind people.

In one aspect of the present invention, a mobile phone comprises a user interface configured to display a menu system to a user and to receive input from the user, and an electronic device coupled to the user interface. The electronic device is configured to: provide the menu system, wherein the menu system comprises a plurality of menu levels, and each one of the menu levels comprises a plurality of distinct menu items, enable the user to browse through the plurality of menu levels in the menu system, enable the user to make a preliminary selection of any distinct menu item from a plurality of distinct menu items at a first menu level in the menu system, wherein the user remains at the first menu level upon making the preliminary selection, provide an audio output in response to the user making a preliminary selection of any of the distinct menu items, wherein the audio output is unique for each distinct menu item, thereby enabling the user to distinguish between the distinct menu items based on the audio output, and enable the user to make a determinative selection of any distinct menu item from the plurality of distinct menu items at the first menu level only after a preliminary selection of that distinct menu item has been made, wherein the user proceeds to a second menu level in the menu system different from the first menu level upon making the determinative selection.

In some embodiments, the mobile phone further comprises a hand-held mobile phone housing, wherein the user interface and the electronic device are coupled to the hand-held mobile phone housing. In some embodiments, the user interface comprises a liquid crystal display (LCD) screen. In some embodiments, the user interface comprises a touchpad and a button.

In some embodiments, the electronic device is configured to provide the audio output using a text-to-speech (TTS) system. In some embodiments, the electronic device is configured to: store voice recordings, associate distinct voice recordings with distinct menu items, and provide stored distinct voice recordings as audio output in response to the user making a preliminary selection of distinct menu items associated with the stored distinct voice recordings.

In some embodiments, the electronic device comprises a memory device configured to store the distinct menu system. In some embodiments, the organization and placement of the distinct menu items in the menu system remains the same unless manually updated by the user using the user interface.

In another aspect of the present invention, a mobile phone comprises: means for displaying a menu system to a user; means for receiving input from the user; means for providing the menu system to the user, wherein the menu system comprises a plurality of menu levels, and each one of the menu levels comprises a plurality of distinct menu items; means for enabling the user to browse through the plurality of menu levels in the menu system; means for enabling the user to make a preliminary selection of any distinct menu item from a plurality of distinct menu items at a first menu level in the menu system, wherein the user remains at the first menu level upon making the preliminary selection; means for providing an audio output in response to the user making a preliminary selection of any of the distinct menu items, wherein the audio output is unique for each distinct menu item, thereby enabling the user to distinguish between the distinct menu items based on the audio output; and means for enabling the user to make a determinative selection of any distinct menu item from the plurality of distinct menu items at the first menu level only after a preliminary selection of that distinct menu item has been made, wherein the user proceeds to a second menu level in the menu system different from the first menu level upon making the determinative selection.

In some embodiments, the mobile phone further comprises a hand-held mobile phone housing. The means for displaying the menu system, the means for receiving input, the means for providing the menu system, the means for enabling the user to browse, the means for enabling the user to make a preliminary selection, the means for providing an audio output, and the means for enabling the user to make a determinative selection are coupled to the hand-held mobile phone housing.

In some embodiments, the means for providing an audio output is configured to provide the audio output using a text-to-speech (TTS) system. In some embodiments, the means for providing an audio output is configured to: store voice recordings; associate distinct voice recordings with distinct menu items; and provide stored distinct voice recordings as audio output in response to the user making a preliminary selection of distinct menu items associated with the stored distinct voice recordings.

In some embodiments, the means for providing the menu system comprises a memory device configured to store the distinct menu system. In some embodiments, the organization and placement of the distinct menu items in the menu system remains the same unless manually updated by the user using the user interface.

In some embodiments, the means for displaying the menu system comprises a liquid crystal display (LCD) screen. The mobile phone of claim 9, wherein the means for receiving input comprises a touchpad and a button.

In yet another aspect of the present invention, a method of providing a menu system on a mobile phone is provided. The method is implemented by an electronic device and comprises: enabling a user to browse through a menu system on the mobile phone via a user interface, wherein the menu system comprises a plurality of menu levels, and each one of the menu levels comprises a plurality of distinct menu items; receiving, from the user via the user interface, a preliminary selection of a distinct menu item from a plurality of distinct menu items at a first menu level in the menu system, wherein the user remains at the first menu level upon making the preliminary selection; providing an audio output in response to the user making the preliminary selection, wherein the audio output is uniquely associated with the preliminarily selected distinct menu item, thereby enabling the user to distinguish the preliminarily selected distinct menu item from the other distinct menu items based on the audio output; and receiving, from the user via the user interface, a determinative selection of a distinct menu item from the plurality of distinct menu items at the first menu level after the preliminary selection of that distinct menu item has been made, wherein the user is advanced to a second menu level in the menu system different from the first menu level in response to the determinative selection.

In some embodiments, the user interface and the electronic device are coupled to a hand-held mobile phone housing. In some embodiments, the user interface comprises a liquid crystal display (LCD) screen. In some embodiments, the user interface comprises a touchpad and a button.

In some embodiments, the step of providing the audio output comprises the electronic device providing the audio output using a text-to-speech (TTS) system. In some embodiments, the step of providing the audio output comprises: the electronic device storing voice recordings; the electronic device associating distinct voice recordings with distinct menu items; and the electronic device providing stored distinct voice recordings as audio output in response to the user making a preliminary selection of distinct menu items associated with the stored distinct voice recordings.

In some embodiments, the electronic device comprises a memory device configured to store the distinct menu system. In some embodiments, the organization and placement of the distinct menu items in the menu system remains the same unless manually updated by the user using the user interface.

In yet another aspect of the present invention, a program storage device readable by a machine is provided, tangibly embodying a program of instructions executable by the machine to perform a method of providing a menu system on a mobile phone. The method comprises: enabling a user to browse through a menu system on the mobile phone via a user interface, wherein the menu system comprises a plurality of menu levels, and each one of the menu levels comprises a plurality of distinct menu items; receiving, from the user via the user interface, a preliminary selection of a distinct menu item from a plurality of distinct menu items at a first menu level in the menu system, wherein the user remains at the first menu level upon making the preliminary selection; providing an audio output in response to the user making the preliminary selection, wherein the audio output is uniquely associated with the preliminarily selected distinct menu item, thereby enabling the user to distinguish the preliminarily selected distinct menu item from the other distinct menu items based on the audio output; and receiving, from the user via the user interface, a determinative selection of a distinct menu item from the plurality of distinct menu items at the first menu level after the preliminary selection of that distinct menu item has been made, wherein the user is advanced to a second menu level in the menu system different from the first menu level in response to the determinative selection.

In some embodiments, the program storage device is encased within a hand-held mobile phone housing.

In some embodiments, the step of providing the audio output comprises providing the audio output using a text-to-speech (TTS) application. In some embodiments, the step of providing the audio output comprises: storing voice recordings; associating distinct voice recordings with distinct menu items; and providing stored distinct voice recordings as audio output in response to the user making a preliminary selection of distinct menu items associated with the stored distinct voice recordings.

In some embodiments, the organization and placement of the distinct menu items in the menu system remains the same unless manually updated by the user using the user interface.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein can be applied to other embodiments. Thus, the present invention is not intended to be limited to the embodiment shown, but is to be accorded the widest scope consistent with the principles and features described herein.

In a preferred embodiment, the steps of the present invention are embodied in machine-executable instructions. These instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product that may include a machine-readable medium having stored thereon instructions that may be used to program a computer (or other electronic devices) to perform a process according to the present invention. The machine-readable medium may include, but is not limited to, ROMs, RAMs, magnet or optical cards, or other type of media/machine-readable medium suitable for storing electronic instructions.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Additionally, it is contemplated that process steps can be performed in a different order than the order illustrated in the flowcharts unless otherwise disclosed, either explicitly or implicitly.

Figure 1B:
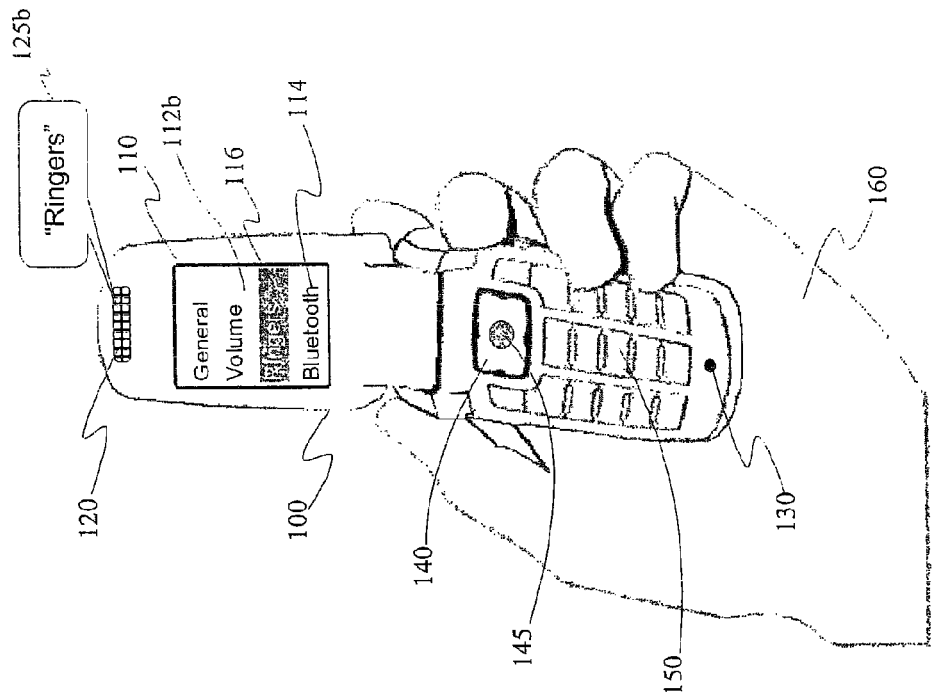
FIG. 1B illustrates one embodiment of a mobile phone that displays a sub-menu with associated audio for the menu items in accordance with the principles of the present invention.
Figure 1A:
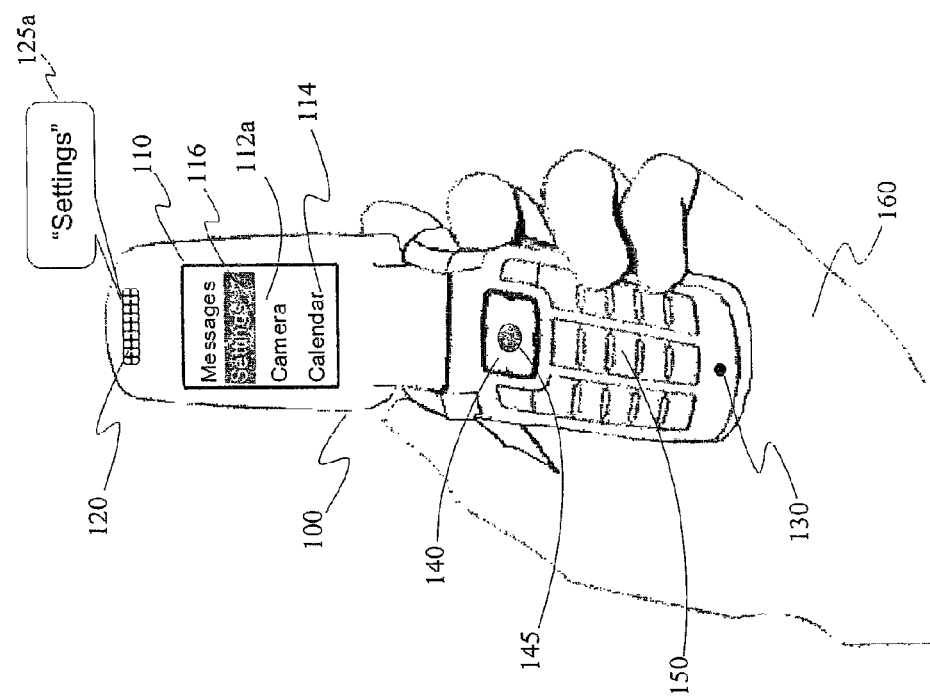
FIG. 1A illustrates one embodiment of a mobile phone that displays a menu with associated audio for the menu items in accordance with the principles of the present invention.

FIG. 1A illustrates one embodiment of a mobile phone 100 that displays a menu with associated audio for the menu items in accordance with the principles of the present invention. In a preferred embodiment, the mobile phone 100 comprises a user interface configured to display a menu system to a user 160 and to receive input from the user 160. In some embodiments, the user interface comprises a screen 110, such as a liquid crystal display (LCD) screen. The menu system is provided to the user 160 as a plurality of menu levels, with each menu level comprising a plurality of distinct menu items. In FIG. 1A, screen 110 displays a first menu level 112a, with four distinct menu items 114 being shown on the screen 110. The four distinct menu items 114 are: "Messages," "Settings," "Camera," and "Calendar." It is contemplated that a variety of other menu items can be used in addition to or as an alternative to these menu items.

In a preferred embodiment, an electronic device is coupled to the user interface. In some embodiments, the electronic device comprises a microprocessor and memory coupled together and encased within the housing of the mobile phone 100. Preferably, the electronic device is configured to provide the menu system to the user 160 and enable the user 160 to browse through the plurality of menu levels in the menu system. In some embodiments, the user 160 browses through the plurality of menu levels via the user interface. For example, in some embodiments such as shown in FIGS. 1A-B, the user interface comprises a touchpad 140 that allows the user 160 to move a highlight cursor 116 up and down the screen 110, thereby enabling the user 160 to make a preliminary selection of any distinct menu item 114 at the current menu level 112a in the menu system. In a preferred embodiment, the movement alone of the highlight cursor 116 to a menu item 114 constitutes a preliminary selection of that menu item 114, and the user 160, therefore, remains at the current menu level 112a.

In a preferred embodiment, the electronic device is configured to provide an audio output 125a in response to the user 160 making a preliminary selection of any of the distinct menu items 114. The audio output 125a is unique for each distinct menu item 114, thereby enabling the user 160 to distinguish between the distinct menu items 114 based on the audio output 125a. For example, in FIG. 1A, the user 160 has made a preliminary selection of the "Settings" menu item. Therefore, the electronic device processes this preliminary selection and provides the audio output "Settings" from a speaker 120 disposed on the mobile phone 100.

In a preferred embodiment, the electronic device is configured to enable the user 160 to make a determinative selection of any distinct menu item 114 at the current menu level 112a after a preliminary selection of that distinct menu item 114 has been made. It is contemplated that a variety of different means can be employed to help the user 160 make the determinative selection. In some embodiments, such as shown in FIGS. 1A-B, the user interface comprises a button 145 coupled to the electronic device. By pressing the button 145, the user 160 signals the electronic device that a determinative selection has been made of the menu item 114 that is currently highlighted. As a result of the determinative selection, the user 160 proceeds to a menu level 112b in the menu system different from the current menu level 112a. FIG. 1B illustrates one embodiment of the mobile phone 100 displaying a sub-menu level 112b as a result of the user 160 making a determinative selection of the "Setting" menu item. FIG. 1B shows sub-menu level 112b comprising the following distinct menu items: "General," "Volume," "Ringers," and "Bluetooth." It is contemplated that a variety of other menu items can be used in addition to or as an alternative to these menu items. This menu level 112b then becomes the current menu level, and the same type of preliminary and determinative selection operations can once again be performed. For example, the user 160 can highlight the "Ringers" menu item and the mobile phone 100 can provide an audio output 125b of "Ringers" in response.

It is contemplated that in addition to the mobile phone components discussed above, the mobile phone of the present invention can comprise other mobile phone components as well, such as a battery, an antenna, a microphone 130 or other audio input, a keypad 150, and other telecommunications circuitry configured to enable a user to send and receive communications. Furthermore, it is contemplated that a variety of other input devices can be used in addition to or as an alternative to those discussed above. For example, the mobile phone of the present invention can include a touch screen, track balls, wheels, switches, and/or the like.

In some embodiments, the electronic device comprises a memory device configured to store the menu system. In some embodiments, the organization and placement of the distinct menu items in the menu system remains the same unless manually updated by the user using the user interface, meaning that the organization and placement of the menu items in the menu system are not changed automatically without user action. The user must initiate a download of an updated menu system or manually rearrange the menu system using the user interface. However, in other embodiments, such a restriction is not present.

Figure 2:
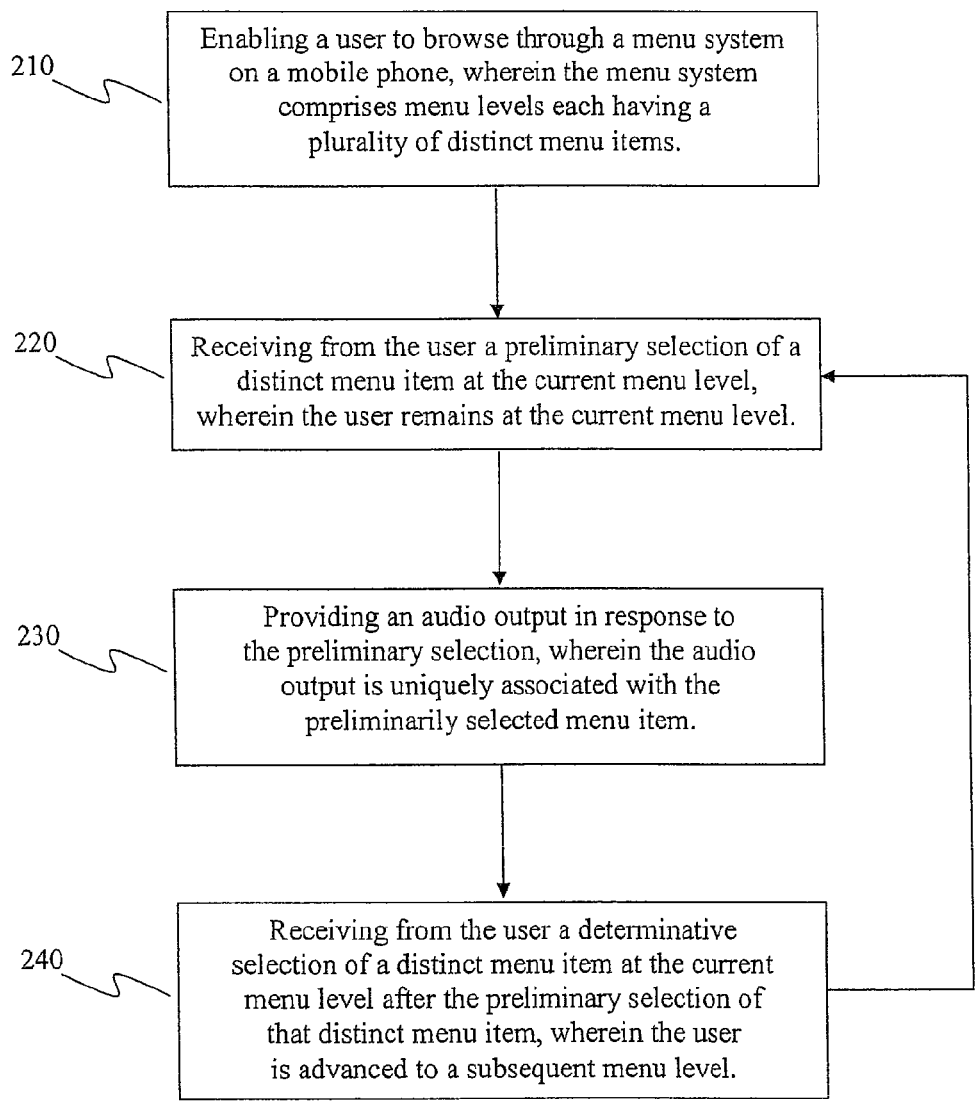
FIG. 2 illustrates one embodiment of a method of providing a menu items with descriptive audio in accordance with the principles of the present invention.

FIG. 2 illustrates one embodiment of a method 200 of providing a menu items with descriptive audio on a mobile phone in accordance with the principles of the present invention. At step 210, an electronic device enables a user to browse through a menu system on a mobile phone, such as mobile phone 100 described above. In a preferred embodiment, the user browses through the menu system via a user interface. The menu system comprises a plurality of menu levels, and each one of the menu levels comprises a plurality of distinct menu items. At step 220, the electronic device receives from the user a preliminary selection of a distinct menu item from a plurality of distinct menu items at the current menu level in the menu system. The electronic device preferably receives this preliminary selection via the user interface. The user remains at the current menu level upon making the preliminary selection. At step 230, the electronic device provides an audio output in response to the user making the preliminary selection. The audio output is uniquely associated with the preliminarily selected distinct menu item, thereby enabling the user to distinguish the preliminarily selected distinct menu item from the other distinct menu items based on the audio output. At step 240, the electronic device receives from the user a determinative selection of a distinct menu item from the plurality of distinct menu items at the current menu level after the preliminary selection of that distinct menu item has been made. The electronic device preferably receives this determinative selection via the user interface. The user is advanced to a subsequent menu level in the menu system different from the current menu level in response to the determinative selection. The process can continuously repeated at step 220, with the subsequent menu level becoming the current menu level.

It is contemplated that the mobile phone of the present invention can provide the distinct audio output for the distinct menu items in a variety of ways.

Figure 3:
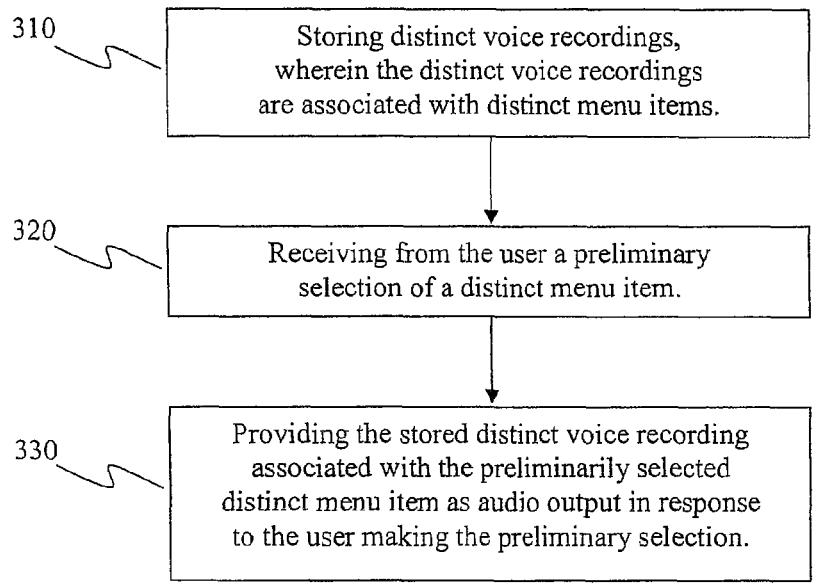
FIG. 3 illustrates one embodiment of a method of providing descriptive audio for distinct menu items using stored voice recordings in accordance with the principles of the present invention.

In some embodiments, the audio output is provided using stored voice recordings. FIG. 3 illustrates one embodiment of a method 300 of providing descriptive audio for distinct menu items using stored voice recordings in accordance with the principles of the present invention. At step 310, the electronic device stores distinct voice recordings, with each distinct voice recording being associated with a distinct menu item in the menu system of the mobile phone. At step 320, the electronic device receives a preliminary selection of a distinct menu item from the user. At step 330, the electronic device determines which stored distinct voice recording is associated with the preliminarily selected distinct menu item and provides the associated voice recording as audio output in response to the user making the preliminary selection.

Figure 4:
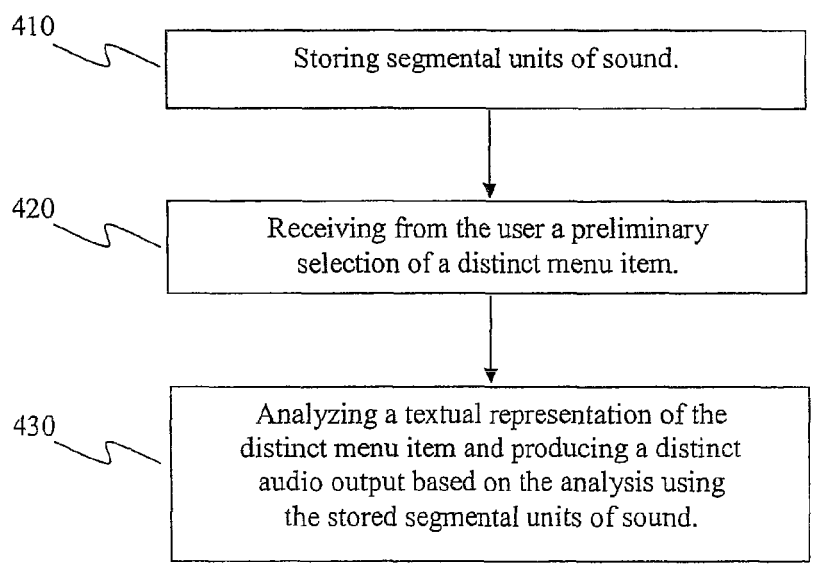
FIG. 4 illustrates one embodiment of a method of providing descriptive audio for distinct menu items using a text-to-speech system in accordance with the principles of the present invention.

Storing voice recordings can become a huge memory space problem, especially for a hand-held device such as a mobile phone. In some embodiments, the present invention addresses this memory space problem by providing the audio output using a text-to-speech (TTS) system. FIG. 4 illustrates one embodiment of a method 400 of providing descriptive audio for distinct menu items using a TTS system in accordance with the principles of the present invention. At step 410, the electronic device stores segmental units of sound. At step 420, the electronic device receives from the user a preliminary selection of a distinct menu item in the menu system of the mobile phone. At step 430, the electronic device analyzes a textual representation of the distinct menu item and produces a distinct audio output based on the analyses using stored segmental units of sound. The electronic device employs a TTS system/application in order to perform this analyses and produce the audio output.

In some embodiments, the electronic device is configured to provide the distinct audio output for the distinct menu items using only a TTS system. In such embodiments, the mobile phone does not store fully formed versions of the distinct audio, such as distinct voice recordings that singularly and completely describe distinct menu items. Such a configuration dramatically reduces the amount of memory space required to provide the distinct audio output.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications can be made in the embodiment chosen for illustration without departing from the spirit and scope of the invention as defined by the claims.

What is claimed is:

1. A mobile phone comprising:
a user interface configured to display a menu system to a user and to receive input from the user; and
an electronic device coupled to the user interface, wherein the electronic device is configured to:
provide the menu system, wherein the menu system comprises a plurality of menu levels, and each one of the menu levels comprises a plurality of distinct menu items,
enable the user to browse through the plurality of menu levels in the menu system,
enable the user to make a preliminary selection of any distinct menu item from a plurality of distinct menu items at a first menu level in the menu system, wherein the user remains at the first menu level upon making the preliminary selection,
provide an audio output in response to the user making a preliminary selection of any of the distinct menu items, wherein the audio output is unique for each distinct menu item, thereby enabling the user to distinguish between the distinct menu items based on the audio output, wherein the audio output is formed from a plurality of stored segmental units of sound, one or more of the stored segmental units of sound being used to form the audio output response for a plurality of the distinct menu items, thereby reducing the amount of memory necessary to provide the audio outputs for the plurality of menu items, and
enable the user to make a determinative selection of any distinct menu item from the plurality of distinct menu items at the first menu level only after a preliminary selection of that distinct menu item has been made, wherein the user proceeds to a second menu level in the menu system different from the first menu level upon making the determinative selection,
wherein organization and placement of the distinct menu items in the menu system remains the same unless manually updated by the user using the user interface.

2. The mobile phone of claim 1, further comprising a hand-held mobile phone housing, wherein the user interface and the electronic device are coupled to the hand-held mobile phone housing.

3. The mobile phone of claim 1, wherein the electronic device is configured to provide the audio output using a text-to-speech (TTS) system.

4. The mobile phone of claim 3, wherein the electronic device is configured to provide the audio output using only a text-to-speech (TTS) system, not a voice recording of the complete audio output.

5. The mobile phone of claim 1, wherein the electronic device is configured to:
store voice recordings;
associate distinct voice recordings with distinct menu items; and
provide stored distinct voice recordings as audio output in response to the user making a preliminary selection of distinct menu items associated with the stored distinct voice recordings.

6. The mobile phone of claim 1, wherein the electronic device comprises a memory device configured to store the distinct menu system.

7. The mobile phone of claim 1, wherein the user interface comprises a liquid crystal display (LCD) screen.

8. The mobile phone of claim 1, wherein the user interface comprises a touchpad and a button.

9. The mobile phone of claim 1, wherein the audio output is formed from a plurality of stored segmental units of sound in response to performing an analysis of a textual representation of the selected distinct menu item.

10. The mobile phone of claim 1, wherein the menu system is updated when another menu system is downloaded.

11. The mobile phone of claim 1, wherein the menu system is updated when the menu system is rearranged.

12. A mobile phone comprising:
means for displaying a menu system to a user;
means for receiving input from the user;
means for providing the menu system to the user, wherein the menu system comprises a plurality of menu levels, and each one of the menu levels comprises a plurality of distinct menu items, wherein the means for providing the menu system comprises means for maintaining organization and placement of the distinct menu items in the menu system remains the same unless manually updated by the user using the user interface;
means for enabling the user to browse through the plurality of menu levels in the menu system;
means for enabling the user to make a preliminary selection of any distinct menu item from a plurality of distinct menu items at a first menu level in the menu system, wherein the user remains at the first menu level upon making the preliminary selection;

means for providing an audio output in response to the user making a preliminary selection of any of the distinct menu items, wherein the audio output is unique for each distinct menu item, thereby enabling the user to distinguish between the distinct menu items based on the audio output wherein the audio output is formed from a plurality of stored segmental units of sound, one or more of the stored segmental units of sound being used to form the audio output response for a plurality of the distinct menu items, thereby reducing the amount of memory necessary to provide the audio outputs for the plurality of menu items; and means for enabling the user to make a determinative selection of any distinct menu item from the plurality of distinct menu items at the first menu level only after a preliminary selection of that distinct menu item has been made, wherein the user proceeds to a second menu level in the menu system different from the first menu level upon making the determinative selection.

13. The mobile phone of claim 12, further comprising a hand-held mobile phone housing, wherein the means for displaying the menu system, the means for receiving input, the means for providing the menu system, the means for enabling the user to browse, the means for enabling the user to make a preliminary selection, the means for providing an audio output, and the means for enabling the user to make a determinative selection are coupled to the hand-held mobile phone housing.

14. The mobile phone of claim 12, wherein the means for providing an audio output is configured to provide the audio output using a text-to-speech (TTS) system.

15. The mobile phone of claim 14, wherein the means for providing an audio output is configured to provide the audio output using only a text-to-speech (TTS) system, not a voice recording of the complete audio output.

16. The mobile phone of claim 12, wherein the means for providing an audio output is configured to:
   store voice recordings;
   associate distinct voice recordings with distinct menu items; and
   provide stored distinct voice recordings as audio output in response to the user making a preliminary selection of distinct menu items associated with the stored distinct voice recordings.

17. The mobile phone of claim 12, wherein the means for providing the menu system comprises a memory device configured to store the distinct menu system.

18. The mobile phone of claim 12, wherein the means for displaying the menu system comprises a liquid crystal display (LCD) screen.

19. The mobile phone of claim 12, wherein the means for receiving input comprises a touchpad and a button.

20. A method of providing a menu system on a mobile phone, the method implemented by an electronic device and comprising:
   enabling a user to browse through a menu system on the mobile phone via a user interface, wherein the menu system comprises a plurality of menu levels, and each one of the menu levels comprises a plurality of distinct menu items;
   receiving, from the user via the user interface, a preliminary selection of a distinct menu item from a plurality of distinct menu items at a first menu level in the menu system, wherein the user remains at the first menu level upon making the preliminary selection;
   providing an audio output in response to the user making the preliminary selection, wherein the audio output is uniquely associated with the preliminarily selected distinct menu item, thereby enabling the user to distinguish the preliminarily selected distinct menu item from the other distinct menu items based on the audio output, wherein the audio output is formed from a plurality of stored segmental units of sound, one or more of the stored segmental units of sound being used to form the audio output response for a plurality of the distinct menu items, thereby reducing the amount of memory necessary to provide the audio outputs for the plurality of menu items;
   receiving, from the user via the user interface, a determinative selection of a distinct menu item from the plurality of distinct menu items at the first menu level after the preliminary selection of that distinct menu item has been made, wherein the user is advanced to a second menu level in the menu system different from the first menu level in response to the determinative selection; and
   maintaining organization and placement of the distinct menu items in the menu system until manually updated by the user using the user interface.

21. The method of claim 20, wherein the user interface and the electronic device are coupled to a hand-held mobile phone housing.

22. The method of claim 20, wherein the step of providing the audio output comprises the electronic device providing the audio output using a text-to-speech (TTS) system.

23. The method of claim 22, wherein the step of providing the audio output comprises the electronic device providing the audio output using only a text-to-speech (TTS) system, not a voice recording of the complete audio output.

24. The method of claim 20, wherein the step of providing the audio output comprises:
   the electronic device storing voice recordings;
   the electronic device associating distinct voice recordings with distinct menu items; and
   the electronic device providing stored distinct voice recordings as audio output in response to the user making a preliminary selection of distinct menu items associated with the stored distinct voice recordings.

25. The method of claim 20, wherein the electronic device comprises a memory device configured to store the distinct menu system.

26. The method of claim 20, wherein the user interface comprises a liquid crystal display (LCD) screen.

27. The method of claim 20, wherein the user interface comprises a touchpad and a button.

28. A non-transitory program storage device readable by a machine, tangibly embodying a program of instructions executable by the machine to perform a method of providing a menu system on a mobile phone, wherein the method comprises:
   enabling a user to browse through a menu system on the mobile phone via a user interface, wherein the menu system comprises a plurality of menu levels, and each one of the menu levels comprises a plurality of distinct menu items;
   receiving, from the user via the user interface, a preliminary selection of a distinct menu item from a plurality of distinct menu items at a first menu level in the menu system, wherein the user remains at the first menu level upon making the preliminary selection;
   providing an audio output in response to the user making the preliminary selection, wherein the audio output is uniquely associated with the preliminarily selected distinct menu item, thereby enabling the user to distinguish the preliminarily selected distinct menu item from the other distinct menu items based on the audio output, wherein the audio output is formed from a plurality of stored segmental units of sound, one or more of the stored segmental units of sound being used to form the audio output response for a plurality of the distinct menu items, thereby reducing the amount of memory necessary to provide the audio outputs for the plurality of menu items; and receiving, from the user via the user interface, a determinative selection of a distinct menu item from the plurality of distinct menu items at the first menu level after the preliminary selection of that distinct menu item has been made, wherein the user is advanced to a second menu level in the menu system different from the first menu level in response to the determinative selection, wherein the organization and placement of the distinct menu items in the menu system remains the same unless manually updated by the user using the user interface.

29. The program storage device of claim 28, wherein the program storage device is encased within a hand-held mobile phone housing.

30. The program storage device of claim 28, wherein the step of providing the audio output comprises providing the audio output using a text-to-speech (TTS) application.

31. The program storage device of claim 28, wherein the step of providing the audio output comprises providing the audio output using only a text-to-speech (TTS) application, not a voice recording of the complete audio output.

32. The program storage device of claim 28, wherein the step of providing the audio output comprises:
    storing voice recordings;
    associating distinct voice recordings with distinct menu items; and
    providing stored distinct voice recordings as audio output in response to the user making a preliminary selection of distinct menu items associated with the stored distinct voice recordings.

\* \* \* \* \*